United States Patent [19]
Loch et al.

[11] Patent Number: 5,004,129
[45] Date of Patent: Apr. 2, 1991

[54] SELF-VENTING CONTAINER

[75] Inventors: Eugene W. Loch, Fort Wayne; David D. Ball, Yoder; George F. Mack, Fort Wayne, all of Ind.

[73] Assignee: ITT Corporation, New York, N.Y.

[21] Appl. No.: 466,900

[22] Filed: Jan. 18, 1990

[51] Int. Cl.$^5$ .............................................. B65D 51/16
[52] U.S. Cl. .................................. 220/366; 220/89.1; 429/53; 429/97; 206/333
[58] Field of Search ............... 220/366, 202, 203, 208, 220/209, 900, 1 V, 71, 72, 83, 315, 324, 361, 356, 357, 89.1; 215/270; 224/902; 294/903; 429/53, 54, 55, 56, 96, 97, 98, 99, 100; 206/333

[56] References Cited

U.S. PATENT DOCUMENTS

| | | | |
|---|---|---|---|
| 1,778,171 | 10/1930 | Snyder | 429/100 |
| 2,376,712 | 5/1945 | Moran | 429/54 |
| 2,592,207 | 4/1952 | Stamper | 429/55 |
| 2,592,209 | 4/1952 | Stamper | 224/902 X |
| 2,743,035 | 4/1956 | Fogarty | 429/53 X |
| 2,936,094 | 5/1960 | Smith | 220/366 X |
| 3,791,875 | 2/1974 | Koehler | 429/97 |
| 3,980,500 | 9/1976 | Sorenson et al. | 429/54 |
| 4,160,857 | 7/1979 | Nardella et al. | 429/97 |
| 4,664,281 | 5/1987 | Falk et al. | 220/3.8 |
| 4,770,958 | 9/1988 | Newman et al. | 429/177 |

Primary Examiner—Stephen Marcus
Assistant Examiner—Stephen K. Cronin
Attorney, Agent, or Firm—Arthur L. Plevy; Patrick M. Hogan

[57] ABSTRACT

A self-venting container includes a top section and a bottom section. The top and bottom sections have adjoining side walls. The side walls are formed of a material which exhibits an elongation percentage greater than 100%. The configuration of the container is such that a cantilever-type movement of the side walls occurs when the walls are subjected to excessive pressure on their interior surfaces, resulting in a gap being formed between the top and bottom sections mainly along the side walls. The gap permits the release of excess pressure from within the container.

11 Claims, 4 Drawing Sheets

SELF-VENTING CONTAINER

This invention was made with Government support under Contract No. DAAB-07-84-C-K503 awarded by the Department of the Army. The Government has certain rights in the invention.

BACKGROUND OF THE INVENTION

This invention relates to containers constructed with vents which allow release of pressure from inside the container and more particularly to a battery box which is self-venting.

Containers have been constructed with vents in order to allow the passage of a liquid or gas out of the container when the liquid or gas reaches a pressure level above that which the container can accommodate. The release of the pressure prevents potential rupture of the container and prevents a cover of the container from being ejected during removal. It also prevents injury to anyone in the vicinity of the container when rupture or ejection of the cover occurs.

Vented containers have a number of uses including holding batteries. An example of a battery which can cause a volatile reaction and result in extremely large pressure in a container is a lithium sulfur dioxide battery. These batteries are in use in both commercial and in military applications.

One type of military battery operated radio uses a lithium BA-5513 battery. The battery is typically housed in an aluminum, die-cast container which has a vent. The container is designed to contain the pressure caused by any volatile reaction, and the vent allows air to escape to relieve the pressure.

There are two major shortcomings to these vented containers. The first is the cross-sectional area of the vents, which is relatively small when compared to the volume and the velocity of the air that is attempting to exit. Therefore, during a battery explosion, the air pressure increases due to what is essentially a "log-jam" at the vent opening. The increase in air pressure then creates excessive stress on the walls of the container. Since the vents are unable to perform their intended function adequately, the increased stress on the walls of the container often results in catastrophic failure.

The second shortcoming is the construction and material of the containers. The containers are typically aluminum die castings which are very brittle. The material ruptures violently rather than yielding in a ductile manner.

Lithium batteries are known to produce explosions of as high as 400 psi in a few milliseconds. The vents on the containers currently being used for the military radios are incapable of releasing such a rapid increase in pressure thereby creating a major safety hazard.

It is therefore an object of the present invention to provide a container which is self-venting.

It is an additional object of the invention to provide a container for a lithium battery which is capable of alleviating internal pressures in the container in a reliable manner.

It is still another object of the invention to provide a venting battery container which is more economical and easier to fabricate.

SUMMARY OF THE INVENTION

A self-venting container includes a top section and a bottom section. The top and bottom sections have adjoining side walls. The side walls are formed of a material which exhibits a predetermined elongation percentage and have a configuration which permits a cantilever-type movement of the side walls when the walls are subjected to excessive pressure on their interior surfaces.

BRIEF DESCRIPTION OF THE DRAWING

The above-mentioned and other features and objects of this invention will become more apparent by reference to the following description taken in conjunction with the accompanying drawing in which.

DESCRIPTION OF THE PREFERRED EMBODIMENT

Figure 1:
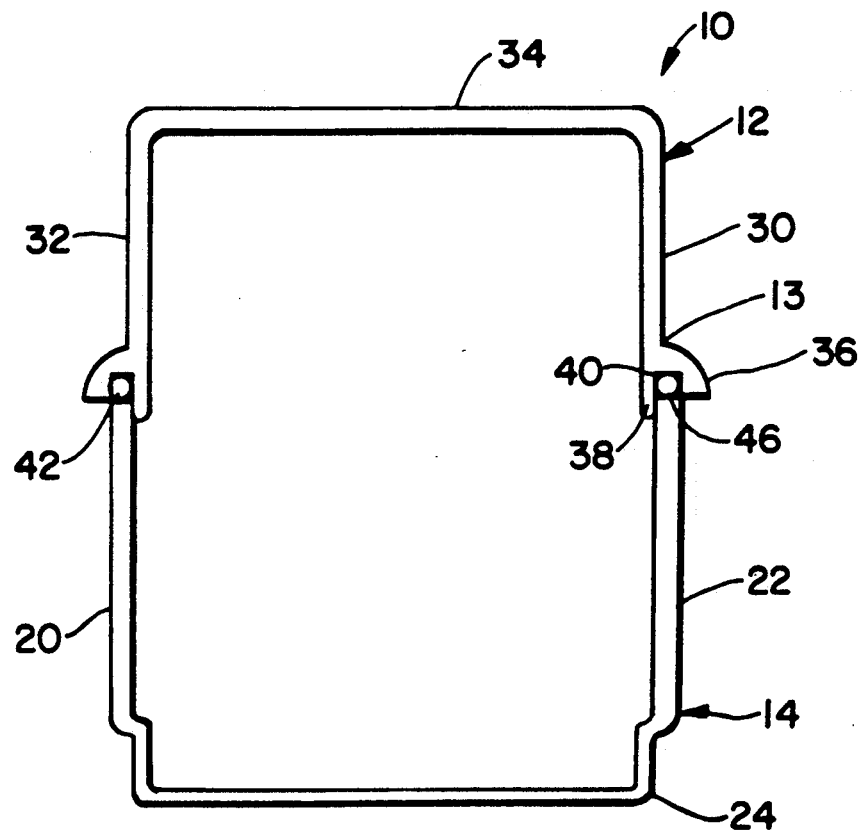
FIG. 1 is a cross-sectional view of the container of the invention in an unexpanded state.
Figure 2:
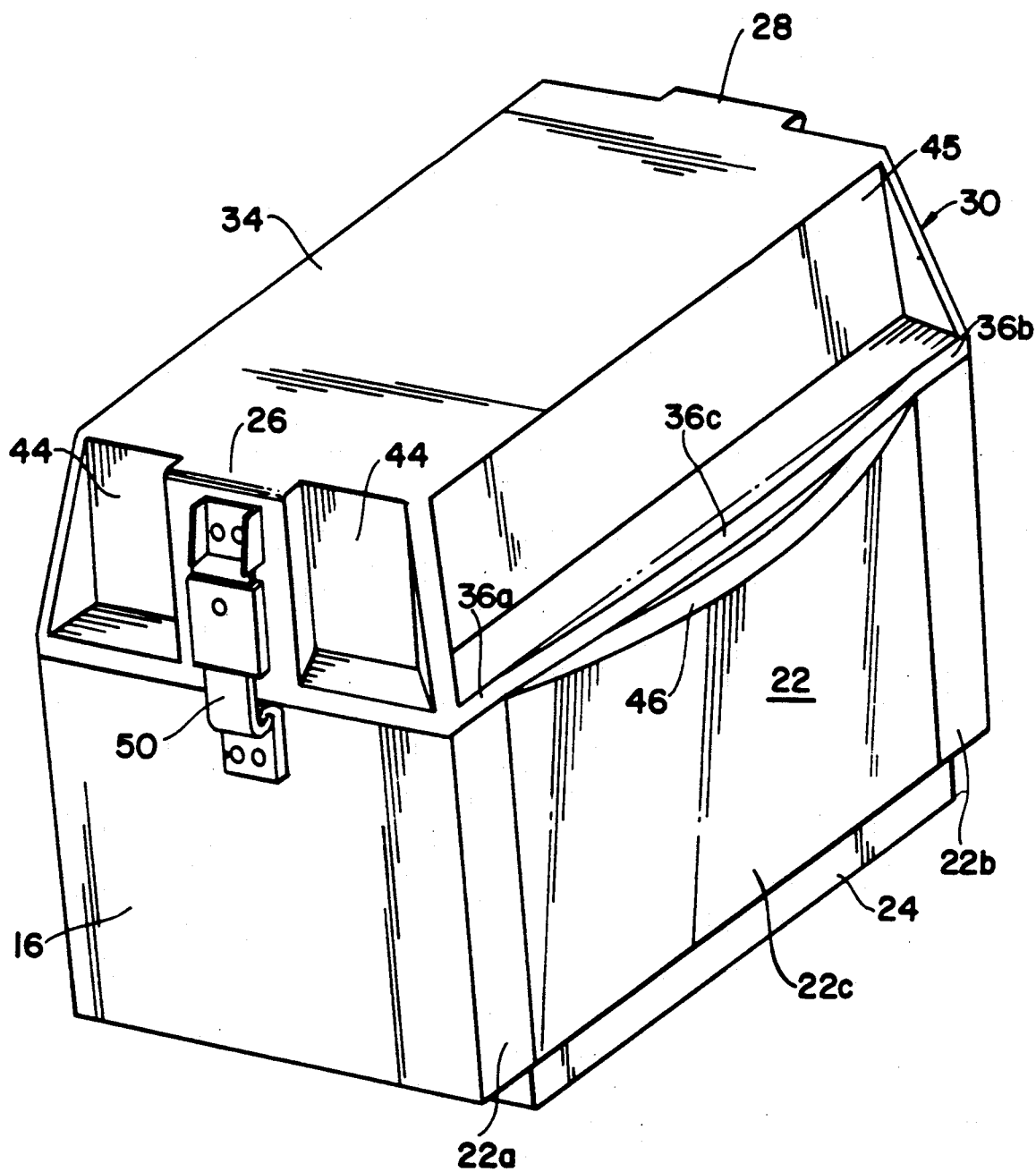
FIG. 2 is a top perspective view of the container in a venting state.
Figure 3:
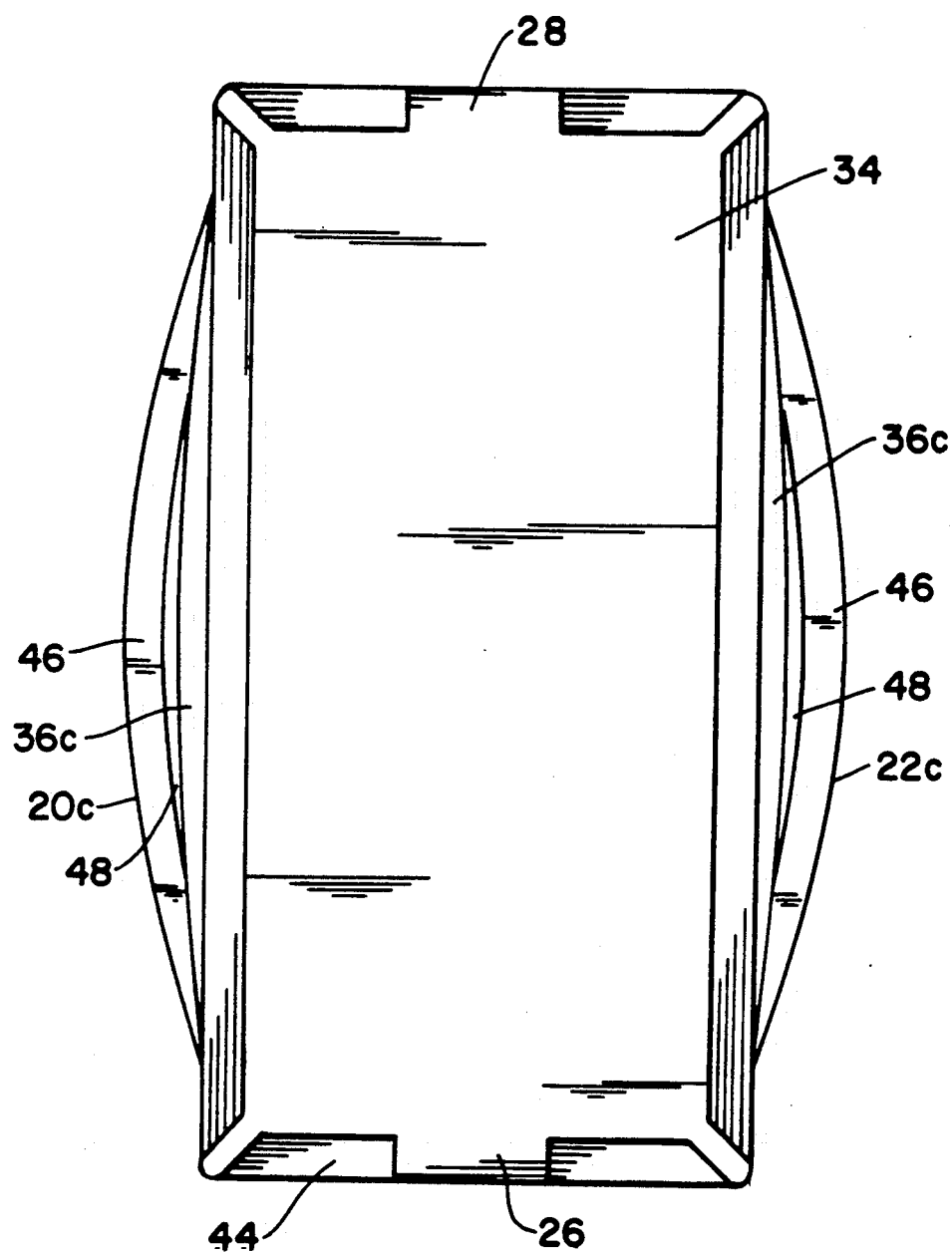
FIG. 3 is a top view of the container illustrating the expanded side walls.

Referring to FIGS. 1, 2 and 3, there is illustrated a container which in the embodiment described herein is a battery box. The container 10 has a top section which forms a lid 12 and a bottom section 14. The bottom section 14 has two opposed end walls 16, 18 and two opposed side walls 20, 22, each wall extending perpendicularly from a rectangular base 24. The juncture between the walls 16, 18, 20, 22 and the base 24 are slightly rounded for ease in making the bottom section by using a mold process.

The lid has a generally U-shaped configuration and includes two opposed end walls 26, 28 and two opposed side walls 30, 32, each of the lid walls extending from a rectangular base 34.

A lip 36 protrudes outwardly from exterior surfaces of the walls 26, 28, 30 and 32 and extends adjacent an edge 13 of the lid 12. The lip 36 has an inner section 38 which extends colinearly with the inner surfaces of the walls 26, 28, 30 and 32. The section 38 rests against an edge of inner surfaces of end walls 16, 18 and side walls 20, 22 when the container is closed. A groove 40 extends into the lip 36 for retaining an O-ring 42.

Latching means 50 secure the container in a closed position. Any well-known, latching means may be used. In this embodiment, the latching means are the cam-action type. One section of the means 50 is attached between each of the indentations 44 in the end walls 26, 28 of the lid 12 and the other section of the means 50 is secured to a respective side wall 16, 18 of the bottom section 14. When the container is closed and latched, the O-ring 42 engages the top edge 46 of the bottom section to provide a water-tight seal.

The lid 12 is also provided with indentations 45 which are optional. The indentations design-related and provide areas for reducing the weight of the container, provided adequate strength and durability are maintained.

The side wall 20 has two end sections 20a, 20b which extend from the base 24 to the top edge 46 and a central section 20c which is located between the end sections. Side wall 22 is similarly constructed with end sections 22a, 22b and central section 22c. The lip 36 extending along side walls 30, 32 has end sections 36a, 36b and central sections 36c which correspond in length with the respective sections of the side walls 20, 22.

In the embodiment described herein, the lid has a length of 6.5 inches along the edge 13, a width of 3.0 inches, and a depth of 2.0 inches. The bottom section has a length of 6.5 inches along the top edge 46, a width of 3.0 inches and a depth of 4.0 inches. These dimensions are approximate and may be varied, depending on the number and type of battery being used.

The actual venting of the box occurs by using a strategic geometric design in conjunction with a flexible material. The vent design relies on a cantilever effect of the side walls 20, 22 with respect to the base 24 and the respective end sections 20a, 20b and 22a, 22b.

FIG. 3 shows the container 10 from the top in a venting condition. As pressure is exerted on the walls of the container, the center sections 20c, 22c of the side walls of the bottom section 14 bow outwardly, creating a gap 48 between the mating lip 36 and top edge 46 of the bottom section. The gap 48 is sufficient to allow the pressurized contained air to escape, thus alleviating the internal pressures in the container without causing a safety hazard.

The lid 12 and bottom section 14 are formed of a material which is more ductile than the previously employed aluminum die casting. The material should have an elongation percentage of at least 100% or greater. One material which satisfies this requirement is plastic.

A preferred type of plastic is one produced by General Electric Company known as Xenoy ® which is an organic thermoplastic resin. The material and its composition are described in General Electric "Material Safety Data" sheet dated November 1965. Xenoy ®, type DX5720, is a polycarbonate blend with an elongation of 165%. Its properties are described in the General Electric Xenoy ® 1987 Properties Guide, some of which are described below.

| Specific gravity | 1.17 |
| --- | --- |
| Specific volume | 23.7 in³/lb |
| Tensile Strength | 7,200 psi |
| Flexural Strength | 10,000 psi |
| Flexural Modulus | 250,000 psi |
| Heat Deflection Temp. | 205 @ 264 psi |

By comparison, an aluminum die casting has an elongation of approximately 3%. The high elongation percentage allows the material to bend and not break like a brittle material.

Figure 4A:
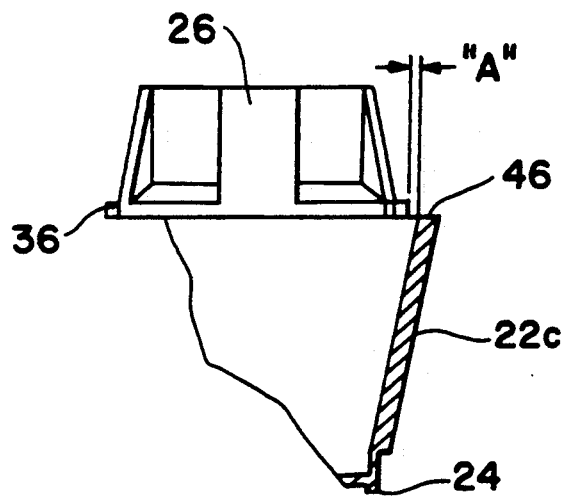
FIG. 4a is a partly cross-sectional view of the container in an expanded state.

FIG. 4a is a partly sectional view of the container 10 in the venting condition. For a container having the dimensions given herein and subject to an internal pressure of 33 psi, a gap results between the lip 36 and the inner surface of the center section of the respective side wall of the bottom section of approximately 0.25 inches at its widest point. This point is designated "A".

Figure 4B:
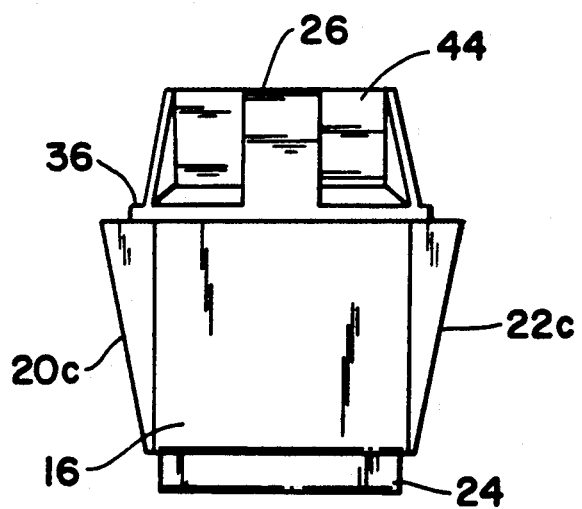
FIG. 4b is an end view of the container venting excess pressure.

FIG. 4b is an end view of the venting container.

The operation of the vent is illustrated by considering two fundamental equations of structural mechanics:

$$y = \frac{Fl^3}{3EI} \quad (1)$$

and $$y = \frac{Fdc}{I} \quad (2)$$

where y = deflection distance (previously defined as "A" in FIG. 4a)
l = length of side walls
F = force of pressure on walls
E = modulus of elasticity
I = moment of inertia
d = distance from force to pivot point of wall
c = ½ thickness of material Equation (1) is the deflection equation for a cantilever beam. The long length of the center sections 20c, 22c of the side walls and the low modulus of elasticity of the plastic results in large deflections.

A thickness of approximately 0.12 inches has been shown to produce an effective bowing of the material; however, the deflection is dependent on the other equation factors, as well.

Equation (2) is the bending stress equation for cantilever beams. Although the stress on a brittle, die cast would be high, the ductility and non-linear behavior of the plastic permits large deflection without high stress. This allows the side walls to bend, but not break.

The center sections 36c of the lip will also bow outwardly but to a lesser extent than the center sections of the side walls 20, 22. This can be seen from Equation (1) and is illustrated in FIG. 3.

Since the end sections of the side walls and the end walls of the bottom section 14 and the lid 12 have a much shorter length than the center sections, outward bowing is slight. Thus, the latching means 50 will remain secured, preventing the lid from breaking away from the bottom section.

The vent of this invention is able to release more air as the pressure in the container increases. This can be seen by Equation (1) where if F (force of pressure) is increased, the deflection or outward bowing increases, thereby increasing the gap and allowing more air to escape. In this way, the container is not limited to a set vent size as with prior containers.

The container having the aforementioned dimensions and being constructed in accordance with this invention can vent a wide range of pressures. Pressures inside the container as low as 3 psi will result in a large enough deflection of the center sections of the side walls to allow air to escape. Pressures as high as 550 psi have been vented from the container without any damage to the container. In addition, the elasticity of a plastic material, and in particular Xenoy ®, permits reuse of the container even after venting pressures of 550 psi.

The invention has been described with reference to a battery box, but any other type of container which is subjected to unexpected increases in internal pressures may be constructed in accordance with this invention.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A self-venting container comprising:
  a rectangular bottom portion formed with a base and a pair of opposed bottom side walls and a pair of opposed bottom end walls, each of said walls being joined substantially perpendicularly to said base and to adjacent ones of said bottom side walls and bottom end walls so as to form a rectangular enclosure with an outer peripheral edge;

a rectangular top portion formed with a lid and a pair of opposed top side walls and a pair of opposed top end walls, each of said walls being joined substantially perpendicularly to said lid and to adjacent ones of said top side walls and top end walls so as to form a rectangular enclosure with an outer peripheral edge matched to said bottom portion outer peripheral edge; and holding means for connecting said bottom portion in sealing contact with said top portion and securing the container in a closed condition, wherein each of said bottom side walls is formed with a bottom central section joined with two bottom end sections on opposite ends thereof so as to form a cantilevered bottom side wall structure; and wherein said central and end sections of said bottom side walls are constructed of a flexible material exhibiting a predetermined elongation percentage, such that the respective central sections thereof bow outwardly with a cantilever effect relative to the end sections when excessive internal pressures in the container are exerted on the walls thereof, thereby creating a gap between the central sections of the bottom side walls and said top portion in order to allow excessive pressures contained in the container to escape, thus alleviating the internal pressures without causing a safety hazard.

2. The self-venting container of claim 1 wherein said predetermined elongation percentage of said material is above 100%.

3. The self-venting container of claim 2 wherein said predetermined elongation percentage of said material is approximately 165%.

4. The self-venting container of claim 3 wherein said material is plastic.

5. The self-venting container of claim 1 wherein said material is an organic thermoplastic resin.

6. The self-venting container of claim 1, wherein said bottom side walls are formed of said flexible material such that the gap increases in relation to the increase in said internal pressures.

7. The self-venting container of claim 1, wherein said top portion includes a lip portion extending circumferentially around the outer peripheral edge thereof.

8. The self-venting container of claim 7 wherein said lip portion surrounds a groove.

9. The self-venting container of claim 8 further comprising an O-ring positioned in said groove.

10. The self-venting container of claim 9, wherein said holding means includes latching means for securing said top portion to said bottom portion.

11. The self-venting container of claim 1, wherein each of said top walls is formed with a top central section joined with two top end sections on opposite ends thereof so as to form a cantilevered top side wall structure, said top end and central sections of said top side walls being constructed of flexible material such that the respective central sections thereof bow outwardly with a cantilever effect relative to the end sections when excessive internal pressures in the container are exerted on the walls thereof.

* * * * *